Oct. 20, 1931.   G. HAMMOND   1,828,249
HOLDER FOR FLOWER CONTAINERS
Filed March 25, 1930   2 Sheets-Sheet 1

INVENTOR
GORDON HAMMOND,
ATTORNEY

Oct. 20, 1931. G. HAMMOND 1,828,249
HOLDER FOR FLOWER CONTAINERS
Filed March 25, 1930 2 Sheets-Sheet 2
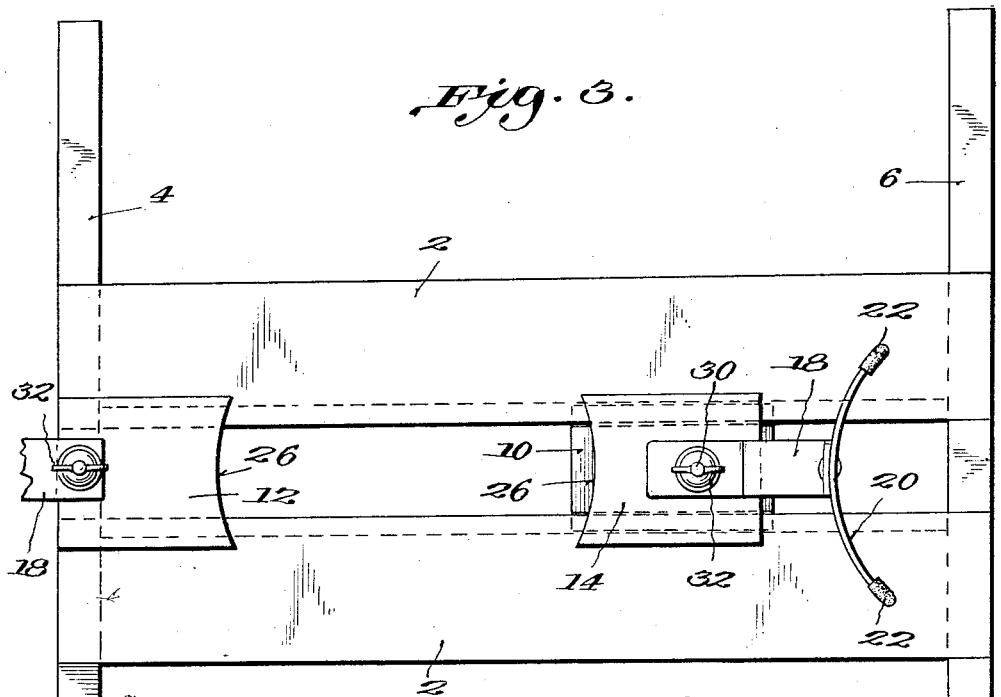
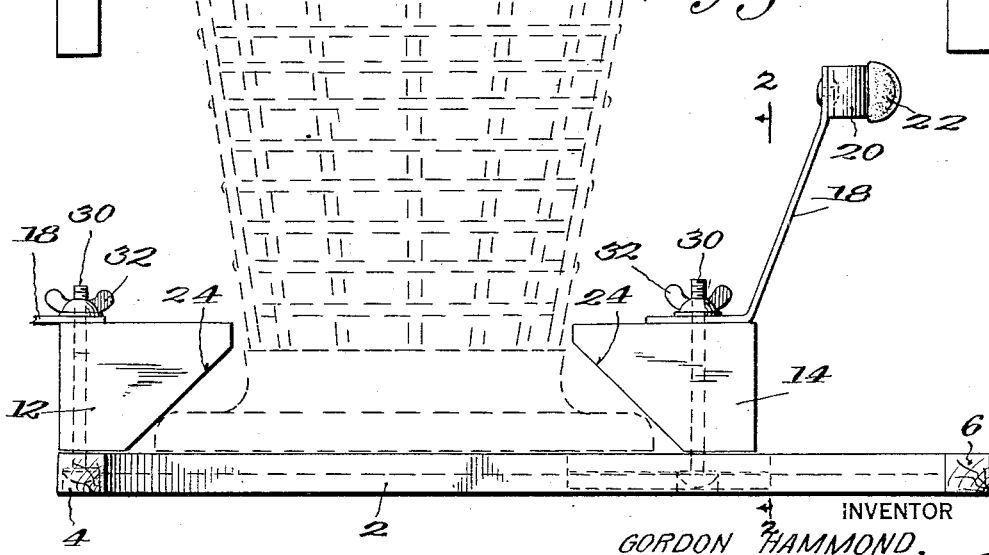
INVENTOR
GORDON HAMMOND,
BY
ATTORNEY Patented Oct. 20, 1931

1,828,249

UNITED STATES PATENT OFFICE

GORDON HAMMOND, OF ASHLAND, VIRGINIA

HOLDER FOR FLOWER CONTAINERS

Application filed March 25, 1930. Serial No. 438,871.

This invention relates to holders for flower baskets and vases and has particular reference to holders of this character to be used by florists to deliver flower-filled baskets and vases from the floral shop to the home of the purchaser.

Flowers are frequently sold by florists in baskets or vases and considerable difficulty has been experienced by florists in delivering such floral units to the purchaser without damage to the flowers themselves or the containing basket or vase. The simplest system heretofore employed by florists is to fill the basket or vase with flowers at the floral shop and to arrange the flowers in the most artistic manner before the baskets leave the shop. This practice has the very desirable advantage of permitting the flowers to be arranged by skilled and artistic hands. The problem then arises to deliver the arranged flower-filled baskets or vases to the purchaser in the same condition in which they leave the floral shop. Heretofore the flower-filled vases and baskets were placed in a delivery truck by means of which they were carried to the desired destinations. A flower-filled basket or vase is very unstable and the vibration and jars of the truck may readily cause the baskets and vases to topple and fall over, thus breaking or injuring the flowers and their containers and in any event, entirely disarranging the flowers within the containers. If the flower containers have been partially filled with water, as is customary in order to retain the freshness of the flowers, the water is spilled of course and the flowers finally reach their destination in a dry disheveled condition. Furthermore, even when the baskets and vases were not upset, the vibrations and jars of the delivery truck often cause them to crowd and jamb together to such an extent as to cause serious injury to the flowers.

So difficult has it been to maintain the flower-filled containers in a vertical position in the truck during delivery and to prevent the several units from crushing each other, some florists have reluctantly adopted the practice of laying the flowers horizontally upon the floor of the truck until the point of delivery was reached. The driver would then stick the flowers in a basket or vase and partially fill the basket or vase with water carried in a special container for this purpose. This method of delivery minimized the breakage of the baskets and vases and injury resulting from toppling and falling of the flowers. Other disadvantages, however, more than offset these favorable points. Carrying the flowers in a flat horizontal position was in itself a sufficient cause of injury as to discredit and detract from this practice. A still further difficulty arose in the arrangement of the flowers in the baskets or vases by the driver. The average florist truck driver is practically devoid of artistic tastes and ability and is incapable of arranging flowers in a basket with that artistic touch which is expected by the purchaser.

A general object of the present invention is to overcome the disadvantages referred to and to provide a device which will facilitate the delivery of flowers and insure the receipt of the flowers by the purchaser in the same high class condition in which they leave the floral shop. A further object of the invention is to provide a device which will securely hold flower baskets or vases filled with flowers in a vertical upright position while being transported in a delivery truck.

A further object is the provision of a holder which will hold the baskets and vases in spaced relation to each other when a plurality is loaded in a delivery truck, and which will prevent the baskets and vases from creeping along the floor of the truck and becoming crowded and congested in spite of the jolts and vibrations of the delivery truck.

Another object of the present invention is to provide a device of the character described which is simple and sturdy in construction, not easily broken and is capable of receiving and holding baskets and vases of different sizes and shapes.

These and other objects of the invention will be apparent from the following specification when read in connection with the accompanying drawings and will be pointed out in the appended claim.

In the drawings:

Fig. 3 is a top plan view of the device.

Fig. 4 is a side elevation view showing the manner in which a basket is secured, the extension bracket being in inoperative position.

Figure 1:
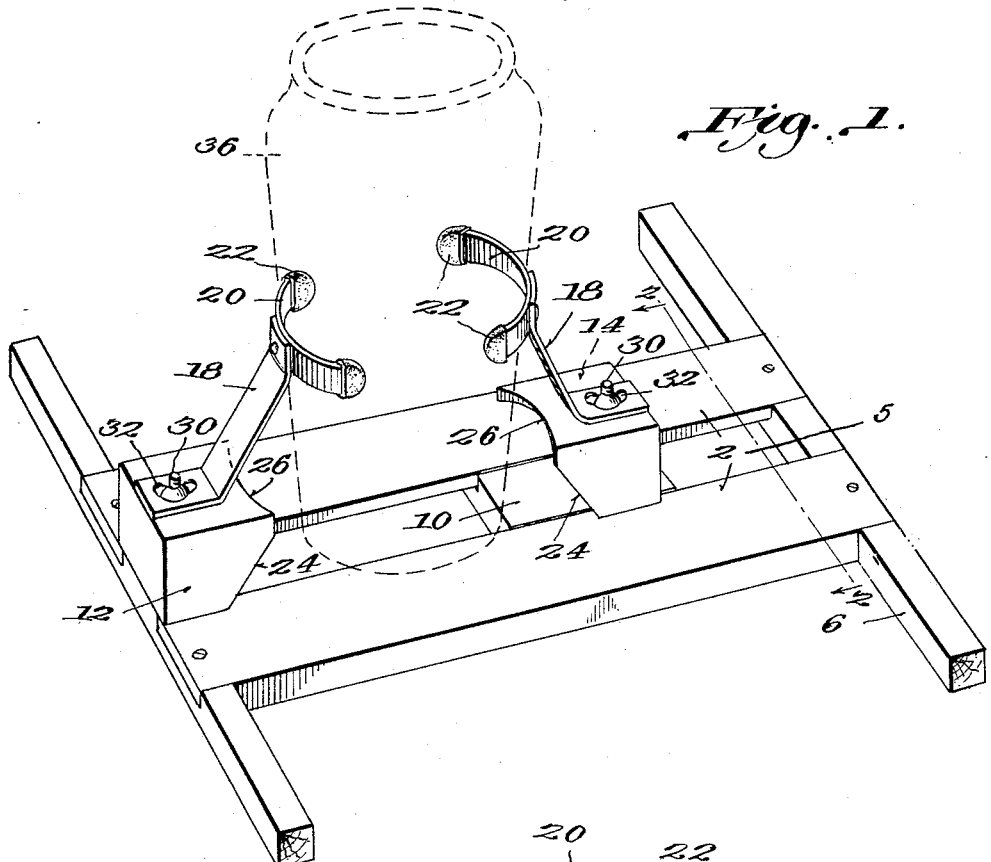
Fig. 1 is a perspective view of the device.
Figure 2:
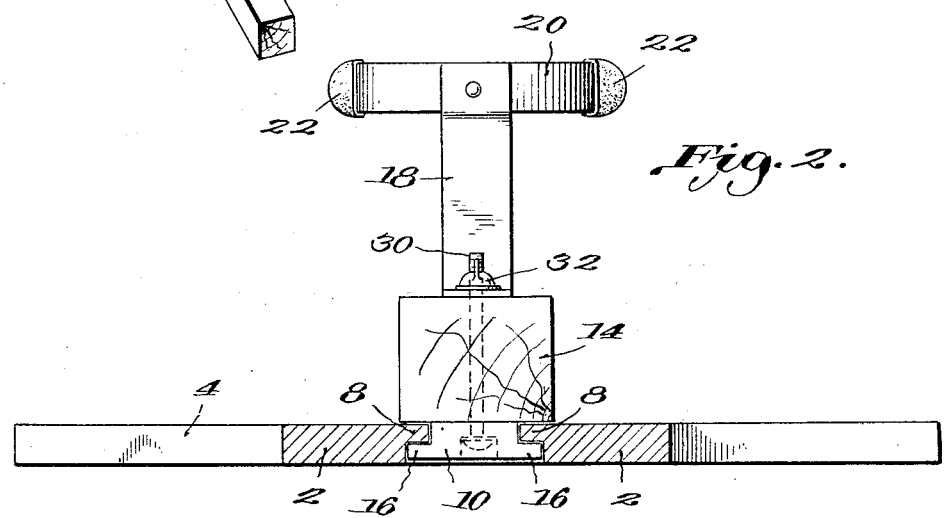
Fig. 2 is a view on the line 2—2 of Fig. 4 with the bracket 18 in the customary position.

The base of the device is preferably formed by two longitudinal members 2, the ends of which are connected to transverse end pieces 4 and 6. As illustrated, the longitudinal members 2 are arranged in parallel relation and are spaced apart to form an intermediate guide slot 5. The inner edges of the longitudinal members adjacent the slot are provided with guide flanges 8 which are co-extensive in length with the slot.

The proportions and dimensions of the longitudinal members 2 and the end pieces 4 and 6 are such as to give to the base formed thereby great stability. When the base is placed on a horizontal surface there is no tendency for it to tilt or move out of a horizontal plane.

The upper face of the base carries a pair of oppositely disposed clamping blocks 12 and 14. The clamping block 12 is intended to be stationary and to this end is rigidly secured to the base by means of a bolt 30 and a locking nut 32. The clamping block 14 is slidably mounted within the slot 5 so as to be adjustable towards and away from the complementary stationary block. The width of the block 14 is greater than that of the slot so that the edges of the block will engage the top surface of the longitudinal members 2. A retaining and guiding element 10 is attached to the bottom of the sliding block 14 by means of a bolt 30 and a retaining nut 32. The guiding element is so dimensioned as to have a sliding fit within the slot 5, the upper surface of the sliding element being substantially flush with the top of the longitudinal members 2. The lower portion of the guiding element is formed with laterally extending flanges 16 which cooperate with the flanges 8 on the longitudinal members to form a guiding track or slideway. From the construction thus described, it will be apparent that the sliding block 14 may be adjusted to any position along the slot 5 and assume varying positions with relation to the stationary block 12. The sliding block may be locked in any position of adjustment by a proper tightening of the retaining nut 32.

The inner and opposed faces of the clamping blocks 12 and 14 are undercut to provide downwardly inclined clamping surfaces 24. The upper portion of each block is cut away as at 26 so that the upper corners of the block will provide spaced contact points for engaging the periphery of a vase or basket clamped between the blocks.

Ordinarily the baskets in which florists deliver flowers are provided with an enlarged circular base, the purpose of which is to lend stability to the basket under ordinary conditions. The device presented in the present invention is designed to hold and support floral baskets of this general character. Fig. 4 of the drawings illustrates a floral basket in position in the holder. The sliding block 14 has been so adjusted along the slot 5 as to cause the undercut clamping surfaces 24 of the blocks to tightly engage the enlarged base of the basket. When thus clamped on the holder, the basket is securely held in a vertical position upon the base of the holder.

While the clamping blocks are sufficient to hold and retain baskets of the general type referred to and pots or vases of relatively small height, they are not entirely satisfactory when used to clamp tall vases, especially those having a restricted bottom. As flowers are frequently sold by florists in the latter type of vase, it is highly desirable to provide a supplemental clamp to handle those vases which cannot be effectively clamped by the blocks alone. To this end, the invention contemplates the provision of additional or supplemental clamping members adapted to engage and clamp a vase a substantial distance above the effective clamping surface of the blocks and which may be selectively used or rendered inoperative as the needs of the particular vase may require. Bracket members 18 are mounted upon the upper face of the clamping blocks. The brackets are inclined inwardly from the bottom to the top and carry at their upper ends oppositely disposed clamping elements 20. These clamping elements are generally curved or arched so that the ends thereof provide spaced contact points for engaging the periphery of a vase clamped therebetween. When the clamping elements 20 are formed of metal or other hard material, it is desirable to cover the ends with a protective resilient material 22 such as rubber, this material serving to buffet or soften the clamping action and prevent scratching or damaging the vase. These protective members are not required when the supplemental clamping elements 20 are formed from wood or other relatively soft materials. The base of the brackets 18 is bent into a horizontal plane and fits flush against the upper surface of the clamping blocks. The base of each bracket is formed with an opening for receiving the bolts 30, the brackets being held in place on the clamping blocks by the locking nuts 32. By loosening the locking nuts the brackets 18 and their associated clamping elements 20 may be rotated about the bolts 30 and moved into an inoperative position. Fig. 1 illustrates the position of the brackets and supplemental clamping elements in the operative position for clamping a tall vase 36. Fig. 4 illustrates the inoperative position assumed by the supplemental clamping elements when the holder is used with a basket or vase of the type which may be effectively clamped by the clamping blocks 12 and 14. The supplemental clamping element 20 which is supported upon the block 12 is necessarily stationary, whereas the complementary clamping element carried by the block 14 partakes of the sliding movement of the latter and adjustment of the supplemental clamping elements is secured by sliding the block 14 along its associated track.

A holder constructed in accordance with the present invention is very effective for the purpose intended. It is simple in construction and operation. A basket or vase mounted therein is securely held in proper vertical position and, owing to the stability of the base of the holder, there is no danger of the baskets or vases tilting or falling over while being delivered from the floral shop to the purchaser. It is quite simple to mount and remove a basket or vase from the holder. The clamping elements are readily adjustable to fit baskets and vases of various sizes and shapes.

Having thus described the invention, what I claim as new and desire to secure by Letters Patent in the United States is:

A holder for flower containers comprising a base formed with a guide slot, a stationary clamping block mounted on said base at one end of said slot, a movable clamping block mounted on said base to slide along said slot, the opposed clamping faces of said blocks being undercut to slope inwardly from top to bottom and adapted to engage the periphery of a container therebetween, supplemental clamping elements carried by each of said blocks, said supplemental clamping elements comprising upright portions and curved horizontal portions having end portions for engaging a container at spaced points at a distance above the clamping faces of said blocks, said supplemental clamping elements being mounted on said blocks for rotation about a vertical axis, and common means for securing the blocks to the base and for securing the supplemental clamping means in any position against rotation.

In testimony whereof I have hereunto set my signature.

GORDON HAMMOND.